3,597,355
HEAT TRANSFER PROCESS
Howard L. Hsu, Hickory Hills, Ill., assignor to Liquid Carbonic Corporation, Chicago, Ill.
No Drawing. Filed Oct. 16, 1969, Ser. No. 867,089
Int. Cl. C09k 3/00
U.S. Cl. 252—73     4 Claims

ABSTRACT OF THE DISCLOSURE

Liquid heat transfer process employing monocyclic terpenes as the heat-exchange medium. Particularly useful for low temperature heat-exchange operations.

---

This invention relates to heat transfer processes, and more particularly, to processes for the transfer of thermal energy by means of a heat exchange liquid.

Many conventional processes involve the transfer of thermal energy to or from an object through physical contact with a heat exchange liquid which is hotter or colder respectively than the object. Many conventional organic solvents have been used as heat exchange liquids, such as Dowtherm for high temperature heat transfer operation, and low molecular weight alcohols, ketones and halogenated hydrocarbons for low temperature heat transfer operation. Low temperature heat transfer processes may have one or more difficulties caused by the volatility, toxicity, flammability, foaming or low temperature viscosity changes of conventional low temperature organic heat-exchange liquids. For example, an efficient and inexpensive method of cooling a heat exchange liquid to the desired low operating temperature is through direct contact of the liquid with an expendable refrigerant such as liquid carbon dioxide. Conventional low temperature heat exchange liquids may exhibit considerable viscosity change or freezing and foaming as liquid carbon dioxide is discharged directly into them, and the expended carbon dioxide gas may carry with it undesired amounts of the flammable or toxic vapor of these materials as it leaves the system. Furthermore, the freezing and boiling points of the heat exchange liquid will necessarily restrict the operational temperature range of the heat transfer process. Heat exchange liquids which might otherwise be useful may have either too high a freezing point, or too low a boiling point (or both) to be employed in a particular low temperature heat transfer process. In addition, some conventional low temperature heat exchange liquids such as acetone, are capable of absorbing any moisture which they may contact. Heat transfer processes employing such fluids may be adversely affected by a rise in freezing point temperature and a rise in the specific heat value caused by absorbed water. An increase in the specific heat of a heat transfer liquid, caused by the presence of absorbed moisture, is particularly disadvantageous for low temperature heat transfer processes which are started and stopped periodically. In such intermittently used processes, the higher specific heat requires additional expense, to cool the system down to the desired operating temperature, each time the process is used. In addition, absorbed moisture may lead to clogging due to ice formation at nozzles, coils, surfaces, transfer lines or other parts of the apparatus which will interrupt or impede fluid circulation.

It is an object of this invention to provide an improved heat transfer process having improved performance and operational flexibility. It is another object to provide a low temperature heat transfer process with improved temperature range and safety. An additional object is to provide a heat transfer process which has improved performance in the presence of moisture. Still another object is to provide a low temperature heat exchange process in which the heat exchange liquid is cooled by direct contact with carbon dioxide. Additional objects will be made apparent by the following detailed description.

Monocyclic terpenes as a class, and d-limonene in particular, are known chemical compounds which are conventionally used as solvents and for a variety of other purposes such as the flavoring of foodstuffs. It has been found that monocyclic terpenes perform excellently as heat exchange liquids over a wide temperature range. Monocyclic terpenes are particularly useful for operation at temperatures below about 0° C. This new use of the known class of monocyclic terpenes provides heat transfer processes which eliminate or reduce the limitations of prior heat transfer processes employing conventional heat transfer fluids, and is especially beneficial for low temperature operation, such as below 0° C.

To the class of monocyclic terpenes belong the terpenes limonene, dipentene, terpinolene, $\alpha$, $\beta$, and $\gamma$ terpinene, $\alpha$ and $\beta$ phellandrene and $\Delta 2,4$ menthadiene. Of this class, d-limonene is particularly preferred because of its properties and because it is relatively inexpensive.

In a heat transfer process employing an organic heat exchange liquid, the heat exchange liquid is used as the means by which heat is exchanged between a substance or object to be heated or cooled, and the heating or cooling source. For example, when a beaker is cooled in an acetone Dry Ice bath, acetone is the heat exchange liquid since it is cooled by its contact with the Dry Ice, and in turn cools the surface of the glass beaker with which it also is in contact.

Monocyclic terpenes are particularly useful in heat transfer processes which employ a heat exchange liquid as a means by which heat is transferred. For example, such a process might involve the circulation, by means of either a pump or convection, in a duct system in heat-exchange contact with an apparatus which heat is to be removed. The heat exchange liquid circulated is maintained at a temperature lower than that of the apparatus to be cooled by some suitable cooling mechanism.

Monocyclic terpenes are considered particularly useful for low temperature applications, for example, below 0° C. and as low as —50° C. or lower. While most liquids have boiling and freezing points which are either both high or both low, monocyclic terpenes exist in the liquid phase over an extremely wide temperature range. For example, d-limonene, a preferred compound of this invention, has a freezing point of about —96.9° C. and a boiling point of about 176.5° C. (a liquid phase temperature range of over 270° C.). In contrast, trichloroethylene, which has been used as a low temperature heat exchange liquid, has a freezing point of about —73° C. and a boiling point of about 87° C. (a liquid phase temperature range of about 160° C.).

Monocyclic terpenes are particularly useful in the lower part of their liquid phase temperature range because they have the advantageous property of a volatility at those temperatures which is lower than many conventional heat transfer liquids, thus facilitating their ready use in open systems. Monocyclic terpenes also exhibit relatively little viscosity change over the entire liquid phase temperature range. These materials thus advantageously retain their excellent fluidity even at low temperatures only slightly above their freezing points. Monocyclic terpenes do not foam or froth when cooled directly by a cryogenic substance, such as liquid carbon dioxide. This is particularly advantageous for low temperature heat transfer processes in which the heat exchange fluid is cooled by the discharge of an expendable refrigerant (which may be a gas, or solid or liquid that vaporizes) directly into the heat exchange liquid.

Monocyclic terpenes are not affected by moisture in heat exchange use. For example, water or ice which might be condensed into a monocyclic terpene heat exchange liquid will form a separate phase which may readily be removed so that heating or cooling performance will not be affected. In addition, monocyclic terpenes have low surface tensions and display excellent wetting of metallic and non-metallic surfaces, properties which not only provides excellent heat transfer efficiency, but also minimizes ice formation of these surfaces. The monocyclic terpenes are noncorrosive with respect to metals and most other materials and have little or no toxicity.

The following example illustrates the operation of a heat transfer process employing a monocyclic terpene.

EXAMPLE

A storage vessel containing room temperature d-limonene is directly cooled by injecting liquid carbon dioxide through a spray orifice which opens into the vessel bottom. A temperature-control switch regulates the temperature of the d-limonene by means of a solenoid valve governing the flow of liquid carbon dioxide into the storage vessel. The temperature-control switch is set at $-100°$ F., and liquid carbon dioxide is continually supplied to the vessel until the d-limonene is cooled to this temperature.

The temperature of the d-limonene in the vessel is maintained at $-100°$ F. through temperature-control switch regulation of the opening and closing of the solenoid valve to provide the required amount of liquid carbon dioxide refrigerant. The expended carbon dioxide escapes through a vent in the top of the vessel. Because of the low volatility of d-limonene, a negligible amount of d-limonene is carried out of the storage vessel with the carbon dioxide. There is no significant frothing or foaming in the storage vessel caused by the discharge of carbon dioxide into the d-limonene. There is little change in viscosity as the d-limonene is cooled to $-100°$ F.

The cold d-limonene is readily pumped at this temperature for circulation to another location where it is used to maintain a device undergoing environmental testing at a temperature of about $-95°$ F. The pumping requirements are well within the acceptable range. For cooling a device to a temperature as low as $-95°$ F. and below, d-limonene is considered excellently suited. It is also considered to be excellently suited for use when carbon dioxide is used as the cooling source.

Orange oil is commercially available from the pressing of orange peels. Such orange oil contains between 80 and 90 percent d-limonene, plus other higher boiling components, and can be used without further refinement as a heat-exchange medium. However, various of these other components are commercially valuable, and it is usually desirable to subject the crude orange oil to distillation to provide relatively pure d-limonene and terpene-free orange oil.

Various of the features of the invention are set forth in the following claims.

What is claimed is:

1. A process for transferring heat by means of an organic heat exchange liquid, wherein the improvement comprises employing a monocyclic terpene as the heat exchange liquid.

2. A process according to claim 1 where said monocyclic terpene is d-limonene.

3. A process according to claim 1 wherein said process is carried out at temperature below about 0° C.

4. A process according to claim 1 wherein said heat exchange liquid is cooled by direct contact with carbon dioxide.

References Cited

UNITED STATES PATENTS

| 3,270,075 | 8/1966 | Derfer et al. | 260—675.5 |
| 3,093,630 | 6/1963 | Muncie | 260—675.5X |

OTHER REFERENCES

"Industrial & Engineering Chemistry," vol. 34, No. 9 (1942), pp. 1028–1034, "Developments in Terpene Chemicals."

HERBERT B. GUYNN, Primary Examiner

D. SILVERSTEIN, Assistant Examiner